M. Park,
Water Filter,
Patented Oct. 4, 1836.
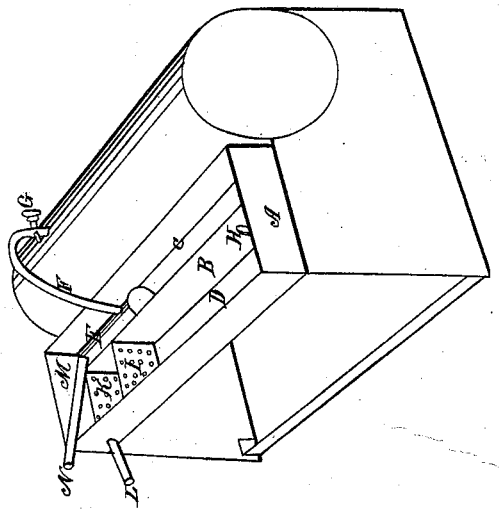
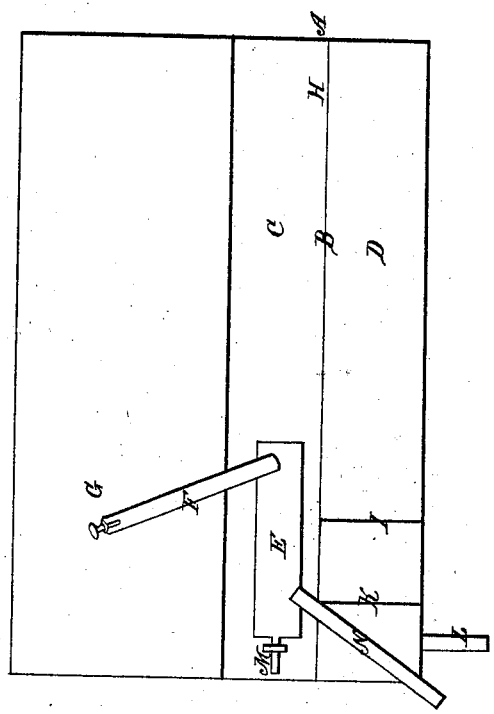

UNITED STATES PATENT OFFICE.

MOODY PARK, OF MADISON, INDIANA.

PURIFYING WATER FOR USE IN STEAM-BOILERS.

Specification of Letters Patent No. 39, dated October 4, 1836.

*To all whom it may concern:*

Be it known that I, MOODY PARK, of Madison, in the county of Jefferson and State of Indiana, have invented a new and useful Improvement in Methods of Purifying Water from Lime and other Substances Before it Enters the Boiler, which is described as follows, reference being had to the annexed drawing of the same, making part of this specification.

In the common method of generating steam, the lime, earthy substances, &c., contained in the water, are deposited, and adhere around the inner surface of the boiler, thus not only requiring it to be frequently emptied, and cleaned but the accumulation of the lime, earth, or sediment within the boiler prevents the water from doing its office of protecting it by conveying off the heat into the water, but by this accumulation of sediment the boiler is rendered liable to be burnt out in a short time.

The improvement which I have made is designed to obviate these evils, and consists of the following apparatus:

In addition to the boiler, and engine heater for the cold water I construct another vessel, A, in which the water is first boiled, and purified before it enters the boiler. This vessel is first constructed of a size, shape, and strength adapted to the boiler, inside this vessel A, is a partition B, dividing it longitudinally into two chambers, C, D, at one end of one of the chambers, C, is placed the heater E, communicating with the main boiler by a pipe F, in which there is a stop-cock G, and in the other end of this chamber is placed a quantity of hay, or straw or other fibrous substance to which the lime, &c. will adhere, and which is removed by changing the hay, &c. The water passing from one side to the other through an aperture H, in the end of the partition, and in this side hay, &c. is also placed. Near the end of the last mentioned chamber are two cross partitions I, K, punched with holes to prevent the hay, &c. passing with the water to the pipe L, conducting to the force-pump.

In one end of the heater is a cock M, to let off the condensed steam, the water from the engine heater passes to the vessel or cistern A, by a pipe N, where it is boiled by the heater communicating with the boiler, the steam passing from the boiler through the pipe F, to the heater E, the lime or other substance with which the water is impregnated adhering to the hay, &c. the water thus purified passes to the force-pump, from whence it is pumped into the boiler in the usual way, the strainers serving to arrest the passage of hay, &c. to the pipe of the force-pump.

The invention here claimed as new, and original and for which a patent is solicited, consists in—

The method of purifying water before it enters the boiler, by means of the before described apparatus.

MOODY PARK.

Witnesses:
 WILLIAM P. ELLIOT,
 WM. BISHOP.